Figure 1:
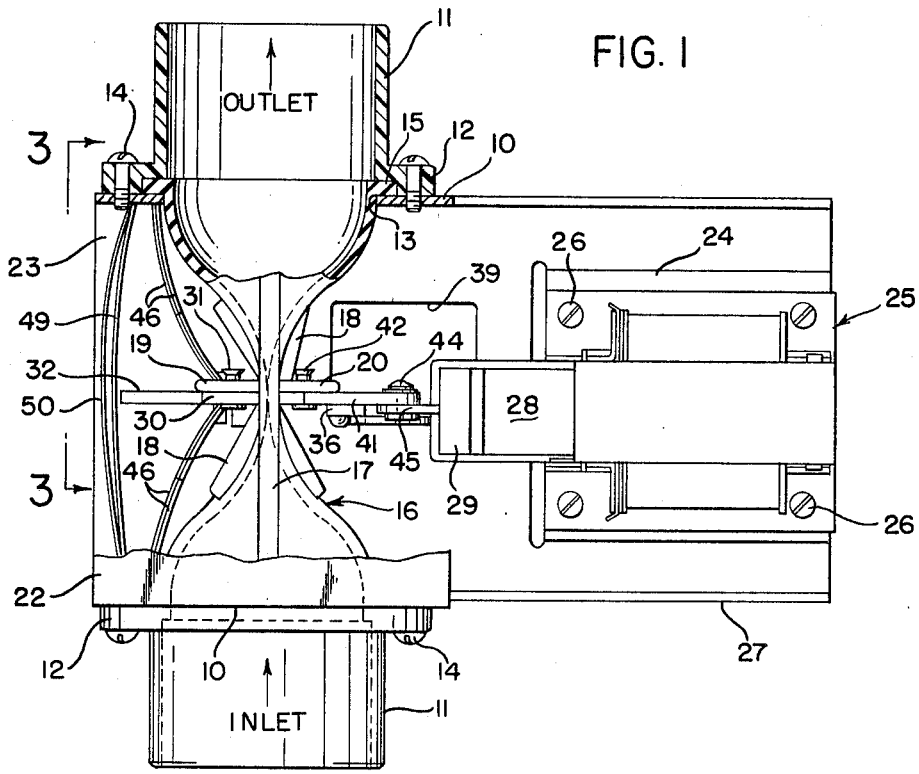

Oct. 11, 1966   W. G. DALLAS   3,278,153
DOUBLE ACTION PINCH TUBE VALVE
Filed June 4, 1963   2 Sheets-Sheet 1

INVENTOR.
WILBUR GORDON DALLAS
BY Hamilton & Cook
ATTORNEYS

Oct. 11, 1966  W. G. DALLAS  3,278,153
DOUBLE ACTION PINCH TUBE VALVE
Filed June 4, 1963  2 Sheets-Sheet 2

INVENTOR.
WILBUR GORDON DALLAS
BY Hamilton & Cook
ATTORNEYS

United States Patent Office 3,278,153
Patented Oct. 11, 1966

3,278,153
DOUBLE ACTION PINCH TUBE VALVE
Wilbur Gordon Dallas, Ashland, Ohio, assignor to Gorman-Rupp Industries, Inc., Bellville, Ohio, a corporation of Ohio
Filed June 4, 1963, Ser. No. 285,326
4 Claims. (Cl. 251—7)

The invention relates generally to valve mechanisms for pinching the walls of a flexible tube together to close off flow through the tube, and more particularly to an improved tube pinching mechanism which effects substantially full opening of the tube.

In certain prior pinch tube valves, one side of the tube is held stationary while the other side is moved to open and close the tube. Such a valve is disclosed in U.S. Patent No. 3,075,551 in which FIGS. 10 and 11 show a single tube pinch valve, one side of which is held stationary while the other side is pinched shut by a solenoid and moved to partly open position by a spring. Because only one side of the tube is moved, the flow opening through the tube in open position is materially restricted.

In many instances it is desirable to have substantially full opening of the tube, e.g., to reduce friction, but this would require excessive movement of the movable side of the tube and correspondingly excessive travel of a solenoid armature if a solenoid is used as the power means. Moreover, to accomplish substantially full opening by movement of one side of the tube would result in distortion of the flow axis and a resulting increasing of friction.

It is an object of the present invention to provide an improved pinch tube valve which accomplishes substantially full open straight line flow in open position.

Another object is to provide an improved tube pinching mechanism which applies power from one side of the tube in such manner as to exert forces on opposite sides of the tube simultaneously during opening and closing.

In translating power applied from one side of the tube to simultaneous opening or closing forces on opposite sides, the load on the solenoid is increased, and thus an excessively powerful solenoid might be required, particularly in the larger sizes of pinch tubes having greater resistance to flexing.

Accordingly, it is a further object of this invention to provide an improved spring biased linkage which reduces the total work required in opening or closing the valve by the power means.

A still further object is to provide a simple and inexpensive pinch tube valve mechanism which accomplishes the foregoing objectives.

These and other objects are attained by the parts, arrangements and combinations comprising the present invention. A preferred mode of carrying out the invention is exemplified in the accompanying drawings and hereinafter described in detail, but it will be understood that modifications are permitted within the scope of the claims forming part hereof. In general terms, the improved mechanism comprises a linkage translating the power stroke of the solenoid armature into forces applied in opposite directions to opposite sides of the tube and acting against a spring force which progressively decreases to a low point during the stroke and then increases at the end of the stroke sufficiently to initiate the return stroke when the solenoid is de-energized.

Referring to the drawings:

FIG. 1 is a side elevation, partly in section, of a preferred embodiment of the improved pinch tube valve mechanism, showing the valve in closed position.

Figure 2:
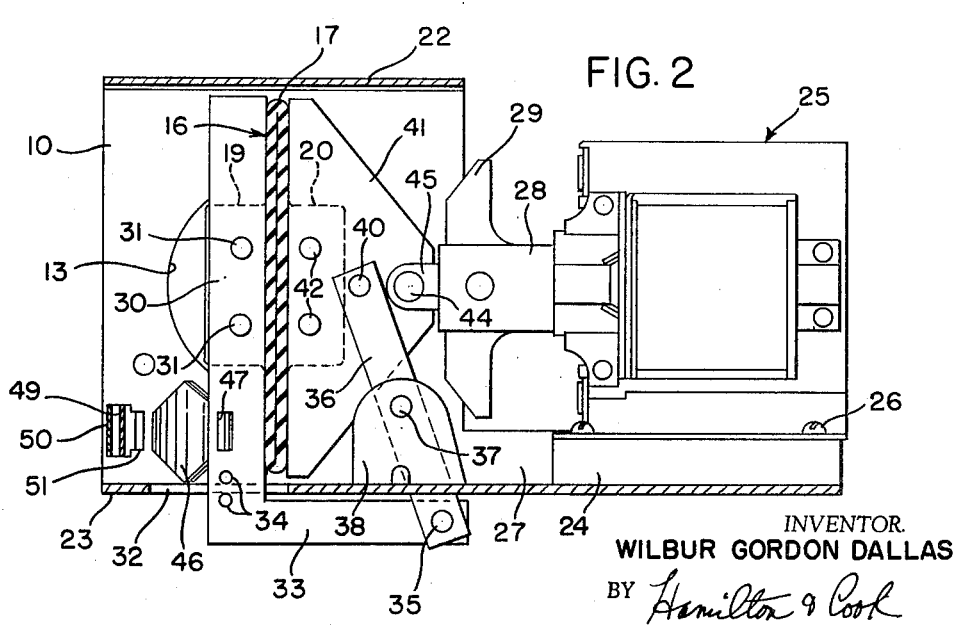
Figure 5:
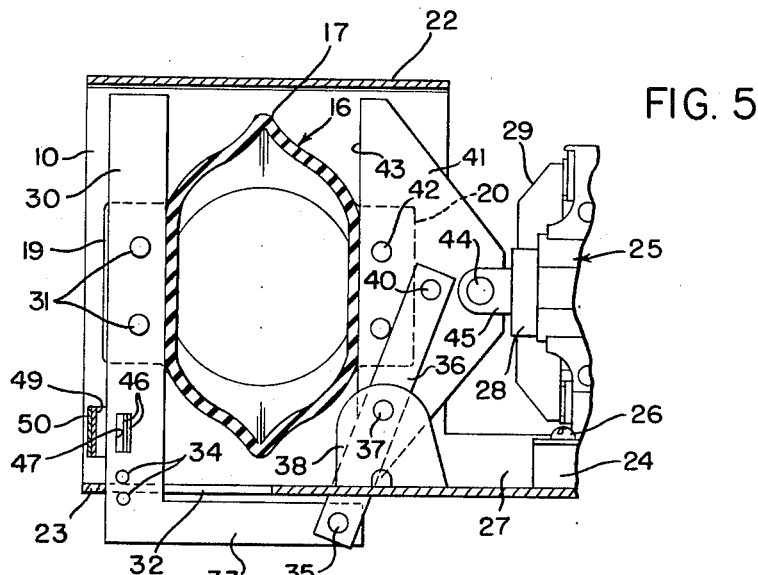
Figure 3:
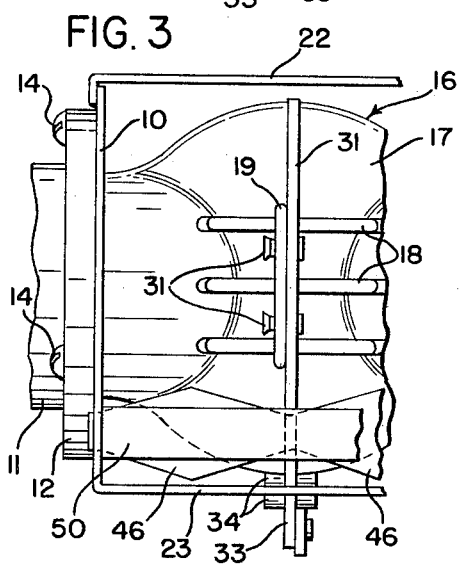
Figure 4:
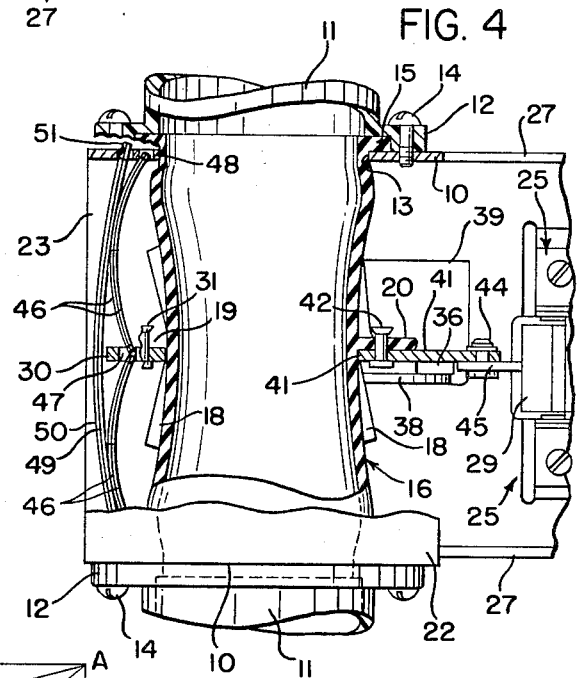
Figure 6:
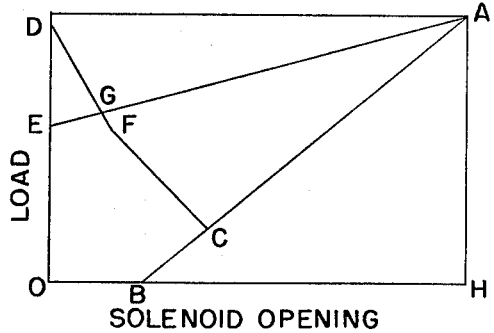

FIG. 2 is a cross sectional view thereof.
FIG. 3 is an elevation on line 3—3 of FIG. 1.
FIG. 4 is a fragmentary view similar to FIG. 1, showing the valve in open position.
FIG. 5 is a fragmentary view similar to FIG. 2, showing the valve in open position.
FIG. 6 is a diagram of the load on the solenoid during its power stroke.

The pinch tube valve unit comprises a preferably rectangular frame having opposed sidewalls 10 in which are mounted aligned connector tubes 11 for connection to the conduits of a flow line. The tubes 11 may be of rigid plastic material and have recessed annular flanges 12 secured to the sidewalls 10 around circular openings 13 in the walls by screws 14. The recessed flanges 12 form annular grooves around the openings 13 for receiving the annular flanges 15 of a flexible pinch tube valve 16 preferably of rubber or rubber-like material.

As indicated in FIGS. 3 and 5, the pinch tube valve 16 preferably has a central transversely flattened portion 17 which is designed to completely close off flow when pinched shut, as indicated in FIG. 2, and to minimize the force required to close the valve while reducing the flexing stresses to which the valve is subjected during opening and closing. Reinforcing ribs 18 may be provided on both sides of the flattened portion 17. However, the design of the valve per se forms no part of the present invention.

Transverse attachment ribs 19 and 20 are also molded on opposite sides of said flattened portion 17 centrally thereof, for connection to linkage means for opening and closing the valve, as hereinafter described. As shown the ribs 19 and 20 extend crosswise of the medial portions of reinforcing ribs 18.

The sidewalls 10 of the frame may be connected at one side of valve 16 by a sidewall 22 and on the opposite side of valve 16 by a sidewall 23 which is extended laterally of the valve and formed to provide raised extension bed 24 on which a solenoid indicated generally at 25 may be mounted by screws 26. Reinforcing flanges 27 may be provided on the edges of the extension 24 as part extensions of the sidewalls 10. The armature 28 of the solenoid is provided with the usual head 29 limiting its closing movement.

The linkage for opening and closing valve 16 includes an L-shaped plate, one leg 30 of which is secured to attachment rib 19 by rivets 31, with the straight inner edge of the leg in contact with the adjacent side of the flattened portion 17 of the valve. One end of leg 30 projects through a slot 32 in sidewall 23, extending transversely of the flow axis of valve 16, and connects with the angular leg 33 extending parallel to slot 32 and inwardly toward solenoid 25. Guide pins 34 may be secured in leg 30 for spanning the slot 32 and sliding over the inner and outer surfaces of the sidewalls along the slot.

The free end of leg 33 is pivotally connected at 35 to one end of a link 36, the intermediate portion of which is pivoted at 37 to an ear 38 bent inwardly from sidewall 23 at the edge of an opening 39 formed therein. The other end of link 36 is pivotally connected at 40 to the central portion of a preferably triangular plate 41 secured by rivet 42 to attachment rib 20 and having its straight inner edge 43 in contact with the adjacent side of flattened portion 17 of the valve on the opposite side from leg 30. The opposite side of plate 41 is pivotally connected at 44 to an ear 45 projecting forwardly from the solenoid armature 28. The pivot point 37 is preferably equidistant from pivots 35 and 40, so that plate 41 and leg 30 will always move equal amounts when one or the other is moved.

When the solenoid is energized, the armature 28 moves the linkage from the position of FIGS. 1 and 2 to the position of FIGS. 4 and 5 from the fully closed to the fully open position of the valve, the linkage providing a double action moving both sides of the valve equal amounts to obtain a full open port axially aligned with the inlet and outlet flow ports with a minimum amount of flexing of the walls of the valve.

The improved spring means for moving the linkage on the return stroke and closing the valve preferably comprises leaf springs 46 which may be wing shaped in plan, each having one end engaged in a slot 47 in leg 30 and the other ends engaged in slots 48 in opposed sidewalls 10. As shown in FIGS. 1 and 4, the lengths of said leaf springs are such that they are always under compression resulting in relatively slight bowing in the valve closed position and greater bowing in the valve open position. As shown, each of the springs 46 may be double leaf springs for increased strength.

The leaf springs 46 are positioned relative to leg 30 and sidewalls 10 so that in the closed position they exert the greatest component of the chordal forces in the direction of plane of the linkage and toward the solenoid armature, to hold the valve tightly closed. If these springs were solely relied upon to initiate the return stroke when the solenoid is de-energized, they would be required to exert sufficient starting force to overcome the resistance of the linkage. Thus referring to FIG. 6, the load on the return stroke would be represented by the line EA with the fully closed position at A, and assuming that the effective force component at E would be sufficient to start the return stroke of the linkage.

In order to reduce the load during the stroke, the leaf springs 46 are positioned so that they move "over center" before the end of the opening stroke, that is, they pass the point where the component of chordal forces is at right angles to the plane of the linkage, as clearly shown on FIG. 4. In such case, the load progresses along a line AB, providing a load for the solenoid to overcome which is rapidly diminishing.

However, in order to provide a force component sufficient to initiate the return stroke when the solenoid is de-energized, bowed leaf springs 49 and 50 are provided forwardly of the springs 46 and have their ends engaged in slots 51 in the opposed sidewalls 10. The inner spring 49 is arranged to contact leaf springs 46 as they pass over center to add a force component in the direction of the plane of the linkage. The contact point is represented on the diagram at C, and the load then progresses along the line CF. At F the outer spring 50 is contacted adding further resistance, and the load then progresses along line FD. At D the effective force component is more than adequate to initiate the return stroke when the solenoid is de-energized.

While the force component to be overcome by the solenoid at D is substantially equal to that at A and greater than at E, nevertheless the total work during the stroke represented by the area bounded by lines ACFDOH is substantially decreased, as compared to the area bounded by lines AEOH if the springs 46 alone were used in such manner as to initiate the return stroke.

Accordingly, the improved spring means reduces the total work to be performed by the solenoid in opening the valve.

What is claimed is:

1. A double action pinch tube valve unit comprising a frame having opposed sidewalls, a pinch tube valve having an intermediate flexible pinch section and its ends mounted in aligned openings in said sidewalls, an operator plate attached to one side of said pinch section, another operator plate attached to the opposite side of said pinch section, a linkage operatively connecting said operator plates for moving both plates toward each other as a valve closing force is applied to one plate, and for moving both plates away from each other as a valve opening force is applied to one plate, power means applied to one of said operator plates for simultaneously moving the plates relatedly in one direction, and spring means opposing said power means during the power stroke for moving the plates relatedly in the opposite direction, said spring means exerting a force which progressively decreases to a low point during the power stroke and then progressively increases up to the end of said power stroke.

2. A double action pinch tube valve unit comprising a frame having opposed sidewalls, a pinch tube valve having an intermediate flexible pinch section and its end mounted in aligned openings in said sidewalls, an operator plate attached to one side of said pinch section, another operator plate attached to the opposite side of said pinch section, a linkage operatively connecting said operator plates for moving both plates toward each other as a valve closing force is applied to one plate, and for moving both plates away from each other as a valve opening force is applied to one plate, a solenoid operatively connected to one of said operator plates for simultaneously opening the valve during the power stroke, and spring means exerting a closing force on one of said plates when the solenoid is de-energized, said spring means being constructed and arranged to progressively decrease the applied force to a low point after the start of the power stroke and then progressively increases up to the end of said power stroke.

3. A double action pinch tube valve unit comprising a frame having opposed sidewalls, a pinch tube valve having an intermediate flexible pinch section and its ends mounted in aligned openings in said sidewalls, an operator plate attached to one side of said pinch section, another operator plate attached to the opposite side of said pinch section, a linkage operatively connecting said operator plates for moving both plates toward each other as a valve closing force is applied to one plate, and for moving both plates away from each other as a valve opening force is applied to one plate, power means applied to one of said operator plates for simultaneously moving the plates relatedly in one direction, and spring means opposing said power means during the power stroke for moving the plates relatedly in the opposite direction, said spring means comprising a leaf spring under longitudinal compression having its ends engaged one in one of said operator plates and the other end in said frame to exert a force component on the plate which progressively decreases to a low point after the start of the power stroke, and a second leaf spring for contacting said first leaf spring at said low point to progressively increase said force component up to the end of said power stroke.

4. A double action pinch tube valve unit comprising a frame having opposed sidewalls, a pinch tube valve having an intermediate flexible pinch section and its ends mounted in aligned openings in said sidewalls, an operator plate attached to one side of said pinch section, another operator plate attached to the opposite side of said pinch section, a linkage operatively connecting said operator plates for moving both plates toward each other as a valve closing force is applied to one plate, and for moving both plates away from each other as a valve opening force is applied to one plate, a solenoid operatively connected to one of said operator plates for simultaneously opening the valve during the power stroke, and spring means exerting a closing force on one of said plates when the solenoid is de-energized, said spring means comprising a leaf spring under longitudinal compression having its ends engaged one in one of said operator plates and the other end in said frame to exert a force component which progressively decreases to a low point after the start of the power stroke, and a second leaf spring for contacting said first leaf spring at said low point to progressively increase said force component up to the end of said power stroke.

(References on following page)

References Cited by the Examiner

UNITED STATES PATENTS

| | | | |
|---|---|---|---|
| 2,770,439 | 11/1956 | Stafford et al. | 251—5 X |
| 2,842,331 | 7/1958 | Anderson | 251—6 |
| 2,979,931 | 4/1961 | Hubbard et al. | 251—7 X |
| 3,075,551 | 1/1963 | Smith et al. | 251—7 |

FOREIGN PATENTS 820,032   9/1958   Great Britain.

WILLIAM F. O'DEA, *Primary Examiner.*
ISADOR WEIL, *Examiner.*
R. GERARD, *Assistant Examiner.*